W. NEWELL.
Coffee Cleaner.
No. 20,891. Patented July 13, 1858.
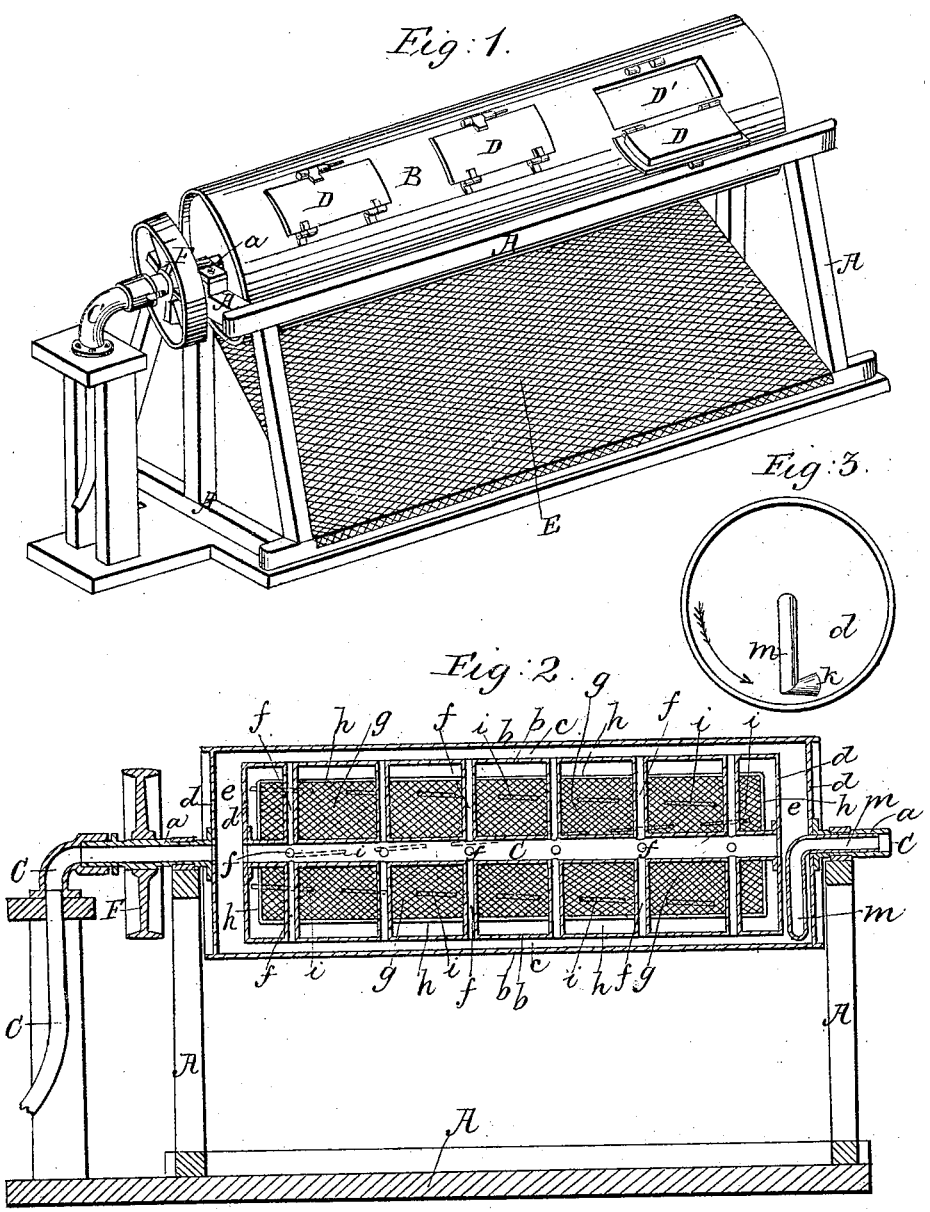

UNITED STATES PATENT OFFICE.

W. NEWELL, OF PHILADELPHIA, PENNSYLVANIA.

APPARATUS FOR CLEANING AND POLISHING COFFEE.

Specification of Letters Patent No. 20,891, dated July 13, 1858.

*To all whom it may concern:*

Be it known that I, WILLIAM NEWELL, of the city and county of Philadelphia and State of Pennsylvania, have invented certain new and useful Improvements in Apparatus for Cleaning and Polishing Coffee; and I do hereby declare the following to be a full, clear, and exact description of the construction and operation of the same, reference being had to the accompanying drawings, making a part of this specification, in which—

Figure 1 represents a perspective view of the apparatus. Fig. 2 represents a central longitudinal and vertical section through the same. Fig. 3 represents a contrivance for dipping up and conveying out of the steam space, the water of condensation.

Similar letters of reference where they occur in the several figures denote like parts of the apparatus in all of them.

Letters Patent of the United States were granted to me on the 3d November 1857, for a process for cleaning and polishing coffee, said process consisting in the combined action of heat, friction, and motion.

My present invention is for an improvement in an apparatus or machine for economically applying the process; and the external appearance of my present apparatus, resembles very much that represented in my former patent above alluded to, but the improvement is in the interior of the cylinder. In my first machine the elements used though effecting the object, did not work rapidly enough to make the operation an economic one. In my present apparatus I make a better and more rapid application of the heat, friction, and motion.

The nature of my invention consists in augmenting and more evenly distributing the heat through the coffee in the cylinder and increasing the friction and motion by the use of woven wire, or open work partitions, flanges, and spaces, as will be hereafter described.

To enable others skilled in the art to make and use my invention, I will proceed to describe the same with reference to the drawings.

A, represents a frame, upon which the cylinder B is supported by hollow journals *a*, *a*. This cylinder is composed of two jackets *b*, *b*, one within the other and having steam space *c*, between them. It also has double heads *d*, *d*, with steam space *e* between them. There is a steam pipe C, running through the center, longitudinally, of the inner cylinder, and from this center pipe, there are hollow arms *f*, extending to and through said inner cylinder—and upon these arms *f* are placed, open work partitions *g*, of punched sheet metal, or woven wire, said partitions dividing the interior of the cylinder into four apartments—there being four sets of arms. Spaces *h*, are left between the outer ends of the partitions, and the inside of the inner jacket through which the coffee can drop, and flanges or ribs *i* are so arranged on the inner periphery of the inner cylinder, as to catch and turn the grains of coffee, and prevent them from turning with the cylinder instead of turning on their own short and long diameters. The meshes or openings in the partitions may also be large enough to allow the grains to drop through from one onto the other—the rotation of the cylinder constantly checking, and then reversing their motion.

I use two sets of doors to the cylinder, viz: one set of tight doors as seen at D; and on the opposite side of the cylinder a set of woven wire doors or their equivalents, that will allow the material that is rubbed off of the grains to pass out. When the coffee is cleaned and polished, the doors D, are opened, and the coffee drops out on the inclined screen E, and is screened. Steam passes through the hollow pipes and tubes— and through the steam spaces so that a few minutes heats up the grains, and the friction end motion are applied and the process continued until the entire cleaning is effected.

To get rid of the water of condensation between the two cylinders or jackets, I attach to one of the cylinder heads, a scoop *k*, and pipe *m*, which pipe leads into the hollow steam pipe C, so that every rotation of the cylinder, causes the scoop *k*, to receive the water from the lowest part, and when it arrives at the highest point, the water runs through the pipe *m*, into the one C, and passes out with the steam to the escape. The whole of the passing steam may go out through the pipe *m*, or it may be small enough to simply carry off the water of condensation, and the steam can escape alongside of it through C. The cylinder may be rotated by an endless belt from any first mover passing around the pulley F. The connections between the steam pipes and hollow journals are packed in the usual way.

By this construction of apparatus I not only get more heat, friction and motion, and thus expedite the operation, but I very much cheapen it also. D', represents the openings through the double jackets or cylinders.

Having thus fully described the nature and object of my invention, what I claim therein as new and desire to secure by Letters Patent is—

1. In combination with the cylinder which contains, and furnishes heat to, the coffee, the open wire diaphragms or partitions for furnishing rubbing surface, substantially as described.

2. I also claim in combination with the open wire rubbing surfaces, the flanges, and heating tubes as herein set forth.

WM. NEWELL.

Witnesses:
A. B. STOUGHTON,
THOS. H. UPPERMAN.